United States Patent [19]

Bower

[11] Patent Number: 5,371,503
[45] Date of Patent: Dec. 6, 1994

[54] RADAR SYSTEM AND METHOD OF OPERATING SAME

[75] Inventor: Paul B. Bower, Sharon, Mass.

[73] Assignee: Raytheon Company, Lexington, Mass.

[21] Appl. No.: 102,600

[22] Filed: Aug. 5, 1993

[51] Int. Cl.5 .............................................. G01S 13/44
[52] U.S. Cl. ...................................... 342/148; 342/149
[58] Field of Search ................................ 342/148, 149

[56] References Cited

U.S. PATENT DOCUMENTS

| | | | |
|---|---|---|---|
| 4,084,160 | 4/1978 | Leuenberger et al. | 342/148 |
| 4,163,975 | 8/1979 | Guilhem et al. | 342/148 |
| 4,449,127 | 5/1984 | Sanchez | 342/149 X |
| 4,472,718 | 9/1984 | Ohashi et al. | 342/148 |
| 4,961,075 | 10/1990 | Ward | 342/148 X |

OTHER PUBLICATIONS

Low-altitude Tracking Over Rough Surfaces I: Theoretical Predictions, David K. Barton, 1979 IEEE, pp. 224-234.
Tracking Radar Performance, Radar Handbook, Editor-in-Chief Merrill I. Skolnik, Naval Research Laboratory, McGraw-Hill Book Company, 1970, pp. 21-46 to 28-25.

*Primary Examiner*—Gilberto Barron, Jr.
*Attorney, Agent, or Firm*—Donald F. Mofford

[57] ABSTRACT

A method of operating a radar system is shown to include the steps of transmitting a plurality of signals, each signal having a different frequency, and receiving, if existing, a corresponding return signal for each one of the plurality of signals. The method further includes ascertaining an angle off beam cross-over of a target from each existing return signal, selecting the angle off beam cross-over having the largest magnitude, ascertaining a reduction factor appropriate for the selected angle and reducing the magnitude of the selected angle by the reduction factor. With such an arrangement, a radar system is provided having improved elevation measurement accuracy.

18 Claims, 9 Drawing Sheets

RADAR SYSTEM AND METHOD OF OPERATING SAME

BACKGROUND OF THE INVENTION

This invention relates to track while scan radars and more particularly to a technique for reducing elevation angle measurement errors resulting from the effects of multipath.

In a tracking radar system, sources of angle-tracking error include errors due to multipath. Multipath angle errors are due to reflections of echo return signals from other objects or surfaces causing the echo return signals to arrive other than the direct return path. Also referred to as low-angle error for radar systems tracking targets at small elevation angles over the earth or ocean surface, multipath errors typically appear in the elevation tracking channel. If the error is severe, residual crosstalk in the radar system may cause some of the error to appear in the azimuth channel. The amount of error is affected by the roughness of the surface in the area of the reflection. When the surface is smooth, the reflection is like a mirror reflection resulting in a greater amount of error. When the surface is rough, the reflection surface causes significant diffuse scattering rather than a mirror reflection, resulting in a lessor amount of error.

Very low altitude targets typically cause severe elevation angle tracking errors which may result in useless elevation tracking data and possible loss of track of the target. Various techniques have been implemented to reduce the effects of multipath errors on radar tracking. One approach to avoid loss of track in elevation is to open the elevation tracking servo loop and place the antenna beam at about a half beam width above the horizon. Azimuth closed loop tracking is continued. Although the elevation angle error detector output indicates a large angle error, it is monitored to observe whether the target is maneuvering upward through the beam. A target rising through the beam will cause a positive angle tracking indication and closed loop elevation tracking is resumed. An alternative technique to reduce multipath error is to use a very narrow beam which can typically be accomplished by using a short wavelength frequency. Still another technique to reduce multipath error in a monopulse radar system is to provide additional apertures in the antenna which provide phase-front curvature information from which target and image location can be derived. Adaptive processing of received signals can be accomplished to effectively provide a control of tracking pattern nulls on both the target and image. Such techniques of using additional apertures can reduce multipath errors but add to the complexity and are applicable to monopulse radar systems.

It should be appreciated that multipath errors are difficult to correct with high range resolution techniques since the direct return signal and the multipath return signal are essentially coherent and their paths are almost equal. Long time averages of the data typically do not give target elevation thus the multipath angle problem is typically minimized by using narrower beam antennas.

SUMMARY OF THE INVENTION

With the foregoing background in mind, it is an object of this invention to provide a technique for minimizing the effect of multipath signals at low elevation angles in a radar system.

Another object of this invention is to provide a radar system having reduced elevation measurement error.

Still another object of this invention is to provide an improved radar system.

The foregoing and other objects of this inventions are met generally by a method of operating a radar system including the steps of transmitting a plurality of signals, each signal having a different frequency, and receiving, if existing, a corresponding return signal for each one of the plurality of signals. The method further includes ascertaining an angle off beam cross-over of a target from each existing return signal, selecting the angle off beam cross-over having the largest magnitude, ascertaining a reduction factor appropriate for the selected angle and reducing the magnitude of the selected angle by the reduction factor. With such an arrangement, a radar system is provided having improved elevation measurement accuracy.

In accordance with another aspect of the present invention, a method of operating a radar system includes the steps of transmitting, during a first dwell period, a first plurality of signals, each signal having a different frequency, and receiving, when obtainable, a corresponding echo signal from each one of the plurality of signals. The method further includes ascertaining an angle off beam cross-over of a target from each obtainable echo signal, selecting the angle off beam cross-over having the largest magnitude and ascertaining a reduction factor appropriate for the selected angle. The method still further includes transmitting, during a second dwell period, a second plurality of signals, each signal having a different frequency and receiving, when obtainable, a corresponding echo signal for each one of the second plurality of signals. Completing the method includes ascertaining an angle off beam cross-over of the target from each obtainable echo signal, selecting the angle off beam cross-over having the largest magnitude and reducing the magnitude of the selected angle by the reduction factor. With such an arrangement, a radar system is provided having technique for minimizing the effect of multipath signals at low elevation angles.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
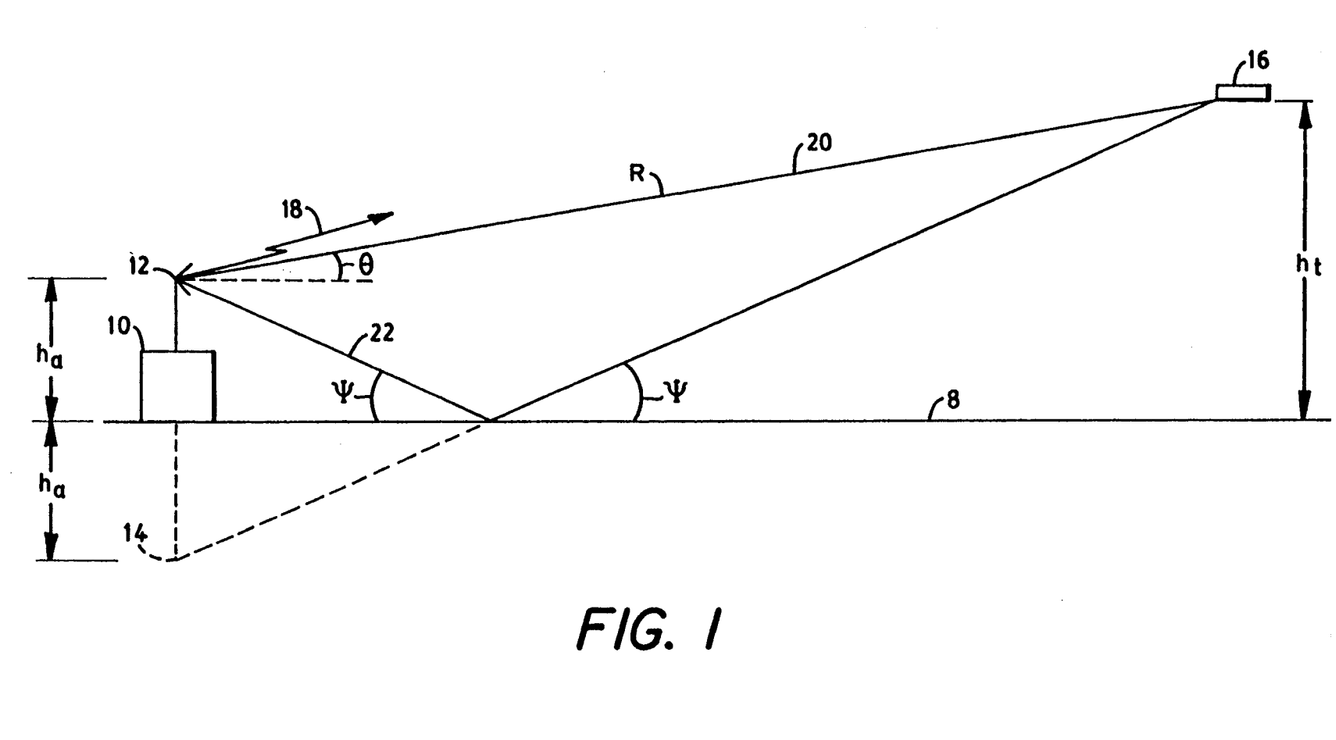
FIG. 1 is a sketch showing in a general manner the geometry of a tactical situation using a radar system according to the invention.

Referring now to FIG. 1, it may be seen that a radar system 10 having an antenna 12 is capable of transmitting a transmitted signal 18. A portion of the transmitted signal 18 is reflected by a target 16 as an echo signal such as direct return signal 20 and is captured by the antenna 12 wherein the radar system 10 will provide an azimuth tracking angle and an elevation tracking angle to show the location of the target 16. Another portion of the transmitted signal 18 is reflected by the target 16 as an indirect return signal 22 wherein the indirect return signal 22 is reflected by a surface 8. It should be appreciated that the path taken by the direct return signal 20 is different than the path taken by the indirect return signal 22. The indirect return signal 22 will appear to have originated from a different source than the target 16 and will result with a multipath angle error in the elevation tracking angle distorting the actual location of the target 16.

At low target elevation angles (i.e. less than one degree), the elevation angle errors induced by multipath effects in a track-while-scan radar can be one-half beam width or larger, depending upon surface reflectivity, target elevation angle and operating frequency. Let us assume a flat smooth earth surface for surface 8 with the effects of earth curvature and roughness discussed hereinafter. For the conditions of interest, $R \gg h_t \gg h_a$, where R is the range from the antenna 12 to the target 16, $h_t$ is the height of the target 16 above the surface 8 and $h_a$ is the height of the antenna 12 above the surface 8. Therefore, the angle $\psi$ is essentially equal to the angle $\Theta$. The phase difference, $\Delta\phi$, between the direct return signal 20 and the indirect return signal 22 is:

$$\Delta\phi = \frac{4\pi h_a h_t}{\lambda R} + \delta r$$

where $\lambda$ is the wavelength of the transmitted signal 18 and $\delta r$ is the phase shift at the reflection at the surface 8 which is typically $\pi$ radians for the target elevation angles of interest. The amplitude of a ground reflected signal (i.e. indirect return signal 22) is modified by a earth reflection coefficient, $P_o$. For a smooth surface and a signal having horizontal polarization, the reflection coefficient is unity and for a smooth surface and a signal having vertical polarization, the reflection coefficient is $\geq 0.8$ for the elevation angles and frequencies of interest. For a randomly rough surface with a Gaussian height distribution, the smooth earth reflection coefficient, $P_o$, is modified by a roughness factor r wherein:

$$r = \exp\left[-2\left(\frac{2\pi H \sin\psi}{\lambda}\right)^2\right],$$

where H is the standard deviation of the height distribution. Thus, for a rough surface, the reflection coefficient, P, is the product of the roughness factor, r, and the smooth earth reflection coefficient, $P_o$. The latter equation is theoretical and provides only an approximation of what actually happens, although good agreement has been found with measured data over the ocean. Reflection coefficients over a land surface are typically less than over an ocean surface so that the effects of multipath are correspondingly less. A technique which reduces multipath effects over an ocean surface will produce a corresponding reduction over a land surface.

The antenna 12 is an elevation monopulse type antenna providing two receive channels to the radar system 10 which employs amplitude monopulse to measure elevation angle. The antenna 12 is rotated at a predetermined rate and the azimuth angle of the target 16 corresponds with the azimuth angle of the antenna 12. The apparent target elevation angle is determined from the magnitude of the vector sums of the direct return signal 20 and the indirect return signal 22 in the two receive channels of the radar system 10. The vector sum, $|E|$, of the direct return signal 20 and the indirect return signal 22 for one of the receive channels can be represented by the equation:

$$|E| = f(R)|g_D \exp(j\phi) + Pg_R \exp(j(\phi + \Delta\phi))|,$$

where, f(R) is the range equation with all non-multipath effects included, $g_D$ is the voltage gain realized by the direct return signal 20, $g_R$ is the voltage gain realized by the indirect return signal 22, $P = rP_o$, $\phi$ is the phase angle of the received signal and $\Delta\phi$ is the phase difference angle between the direct return signal 20 and the indirect return signal 22 as described hereinabove. The latter equation represents conditions wherein diffraction is negligible and the difference in path loss between the direct return signal 20 and the indirect return signal 22 is also negligible which are typical for the conditions of interest. The delta-to-sum ratio, D/S, is given by the equation:

$$D/S = \frac{|E_A| - |E_B|}{|E_A| + |E_B|},$$

where $|E_A|$ is the amplifier of the signal in the first receive channel and $|E_B|$ is the amplitude of the signal in the second receive channel. It should be apparent from the above equations that the indirect return signal 22 creates a bias in the measurement of elevation angle, the severity of which is a function of the earth reflection coefficient and the operating frequency of the signal of the radar system 10, for a particular target altitude and range.

Figure 1A:
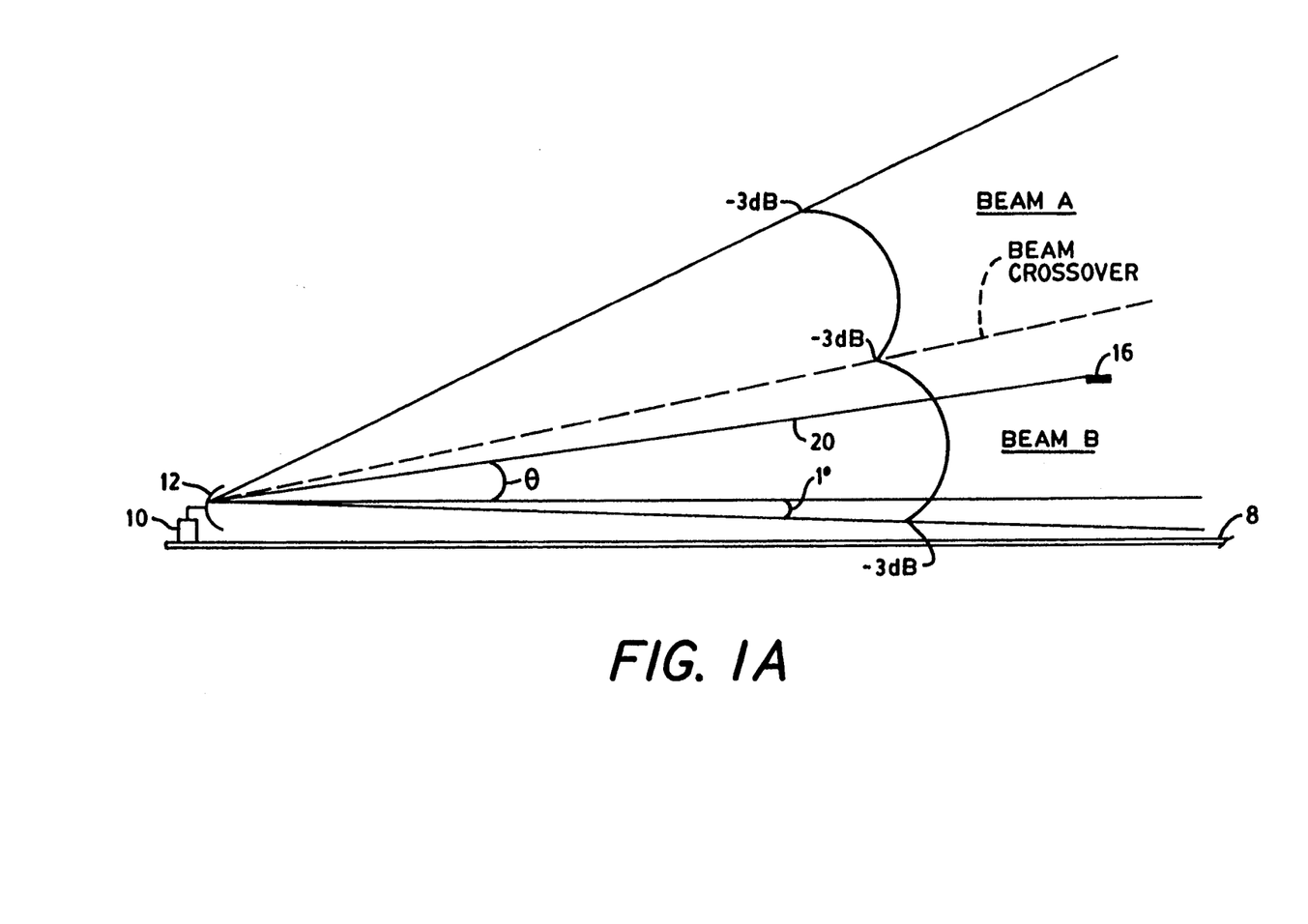
FIG. 1A is a sketch showing the RF energy beam of an antenna of a radar system according to the invention.

Referring now to FIG. 1A, the radar system 10 having two receive channels is fed radio frequency (RF) energy from the antenna 12. The antenna 12 is arranged to feed the two receive channels wherein beam A shows the antenna gain pattern of the antenna 12 for the first receive channel and beam B shows the antenna gain pattern of the antenna 12 for the second receive channel. The position of the antenna 12 is set such that the lower $-3$ dB point of the lower beam, beam B, is at one degree below the horizontal (which is approximately equivalent to placing the $-3$ dB point on the horizon with earth curvature considered). The upper $-3$ dB point of the lower beam, beam B, is positioned coinciding with the lower $-3$ dB point of the upper beam, beam A which is commonly referred to as beam crossover. Without being concerned with the effect of multipath, the target elevation angle to the target 16 is determined the amplitude of the direct return signal 20 as received in the two receive channels of the radar system 10 by taking the delta-to-sum ratio as is known.

Figure 2A:
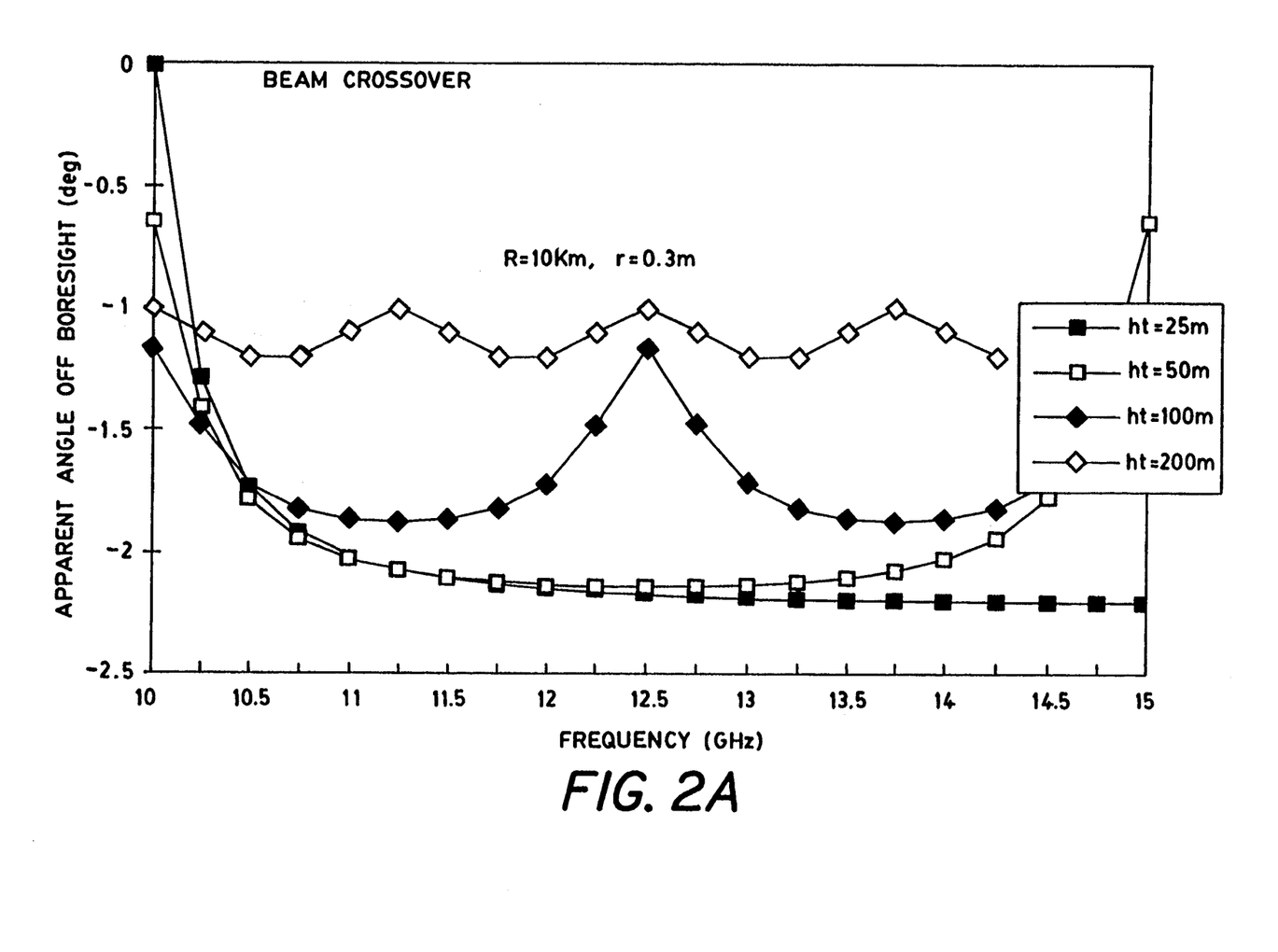
FIG. 2A is a plot of apparent angle vs. frequency for a target at different height levels.
Figure 2B:
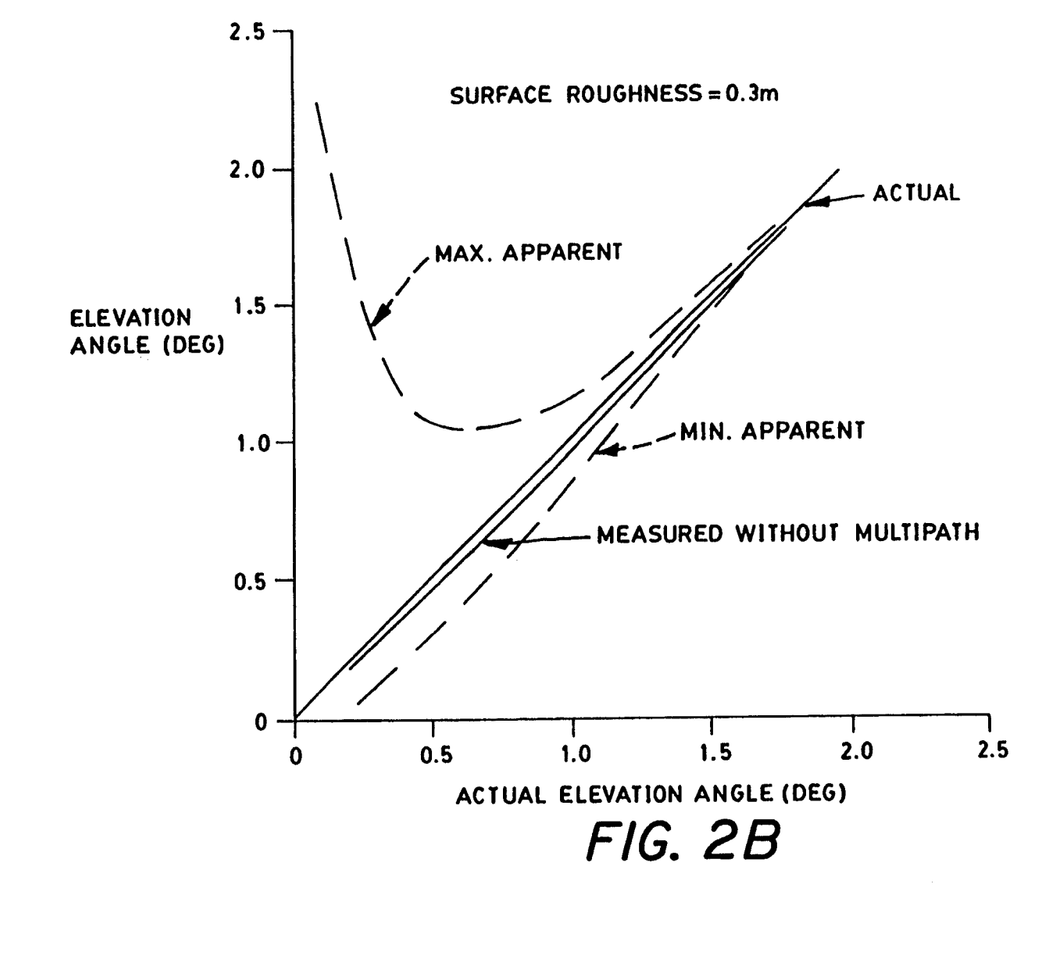
FIG. 2B is a plot of apparent elevation angle vs. actual elevation angle of a target.

With the effects of multipath considered using the above equations and assuming a standard deviation of the height distribution, H, equal to 0.3 meters, FIG. 2A shows a plot of the apparent angle off beam cross-over of a target 16 at a range, R (FIG. 1), of 10 kilometers and at altitudes of 25, 50, 100 and 200 meters (note that beam cross-over is at an elevation angle of 2.2 degrees and that angles below beam cross-over are taken to be negative) at varying frequencies, here 10 GHz to 15 GHz. Referring now to FIG. 2B, the apparent elevation angles are plotted with respect to the actual elevation angle showing a plot of the maximum apparent elevation angle, the minimum apparent elevation angle, the measured elevation angle without multipath being a problem and the actual elevation angle. As can be seen, the apparent elevation angle to the target 16 for the radar system 10 (FIG. 1) can vary considerably due to the effects of multipath.

As we look at FIG. 2A, it can be observed that the apparent angle off beam cross-over changes as a function of frequency. If we measure the angle off beam cross-over using a plurality of frequencies, for example four frequencies, 10, 10.75, 11.5 and 13 GHz and select the apparent angle off beam cross-over having the largest magnitude and reduce the magnitude by a factor of, for example, 0.92, to provide a calculated angle off beam cross-over, the calculated angle off beam cross-over is found to more closely match the actual angle off beam cross-over.

Figure 3:
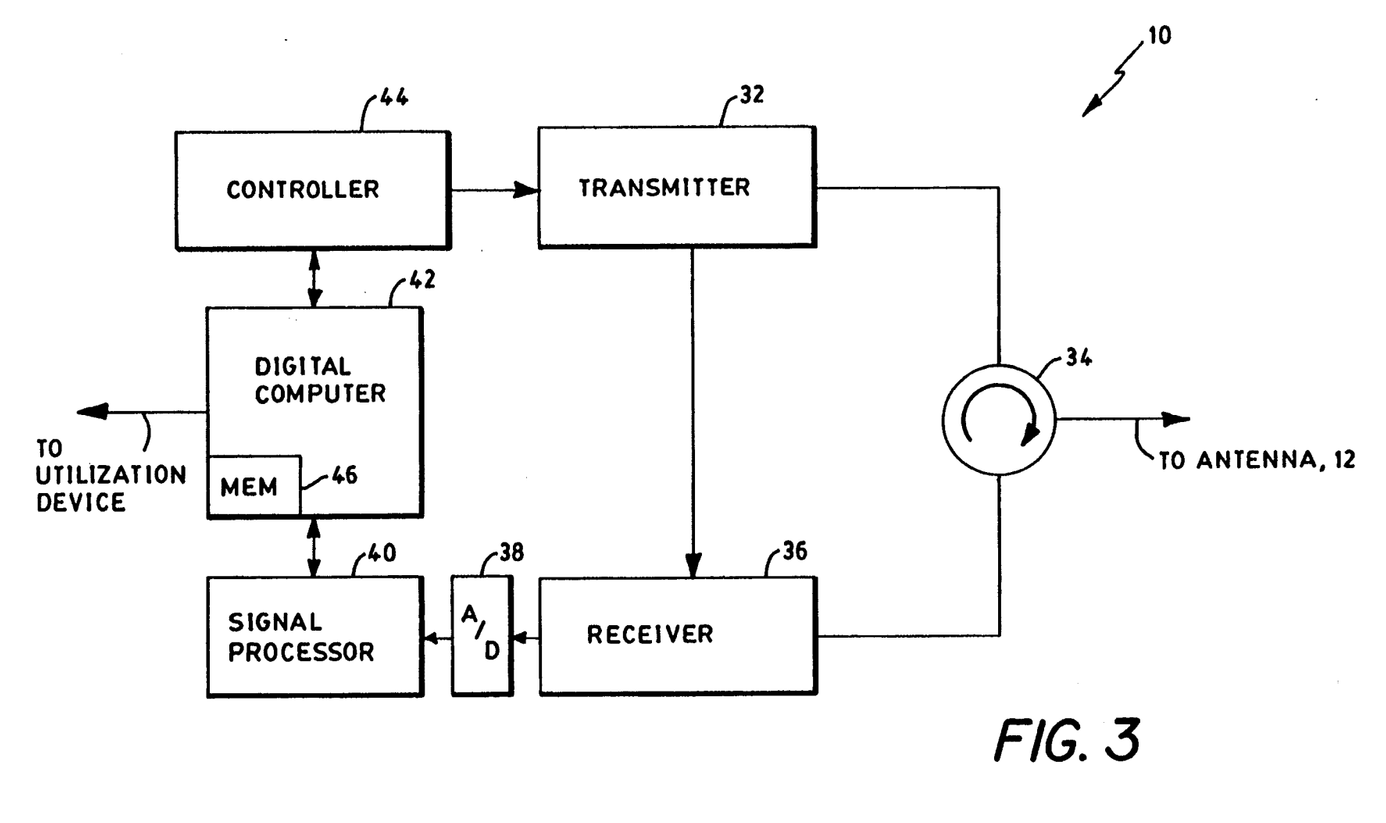
FIG. 3 is a greatly simplified block diagram of a radar system according to the invention.

Referring now to FIGS. 3 and 1, the radar system 10 is known to include a transmitter 32 for providing the transmitted signal 18, which is coupled to the antenna 12 via circulator 34. Radar echo signals, i.e. the direct return signal 20 and the indirect return signal 22, are captured by the antenna 12 and coupled, via circulator 34, to receiver 36. The receiver 36 is effective to downconvert the radar return signals to an I.F. signal and detect the elevation sum and difference signals in a known manner. The output signals from the receiver 36 are digitized in an analog-to-digital (A/D) converter 38 and are provided as input signals to a signal processor 40 wherein said signals are processed in accordance with known techniques to perform the target detection function. The output signals of the signal processor 40 are passed to a digital computer 42 that is effective to perform, inter alia, target tracking and radar timing. The digital computer 42 provides target tracking data to an utilization device which may for example be a radar display or a weapons control system. Completing the radar system 10 is a controller 44 which in response to control signals from the digital computer 42 controls the operating characteristics, such as frequency, pulse repetition frequency, pulse width, etc., of the transmitter 32. It should be appreciated that, because the invention here is directed to an improvement in the way in which signals detected by a conventional radar system are processed, many details of such radar not required for an understanding of this invention have not been shown. Further it will be appreciated that the details of construction of the various elements shown in block form are within the knowledge of any person of skill in the art and need not be illustrated or described. With the foregoing in mind, the digital computer 42 provides control signals to the controller 44 which in turn provides control signals to the transmitter 32 to control the transmitter 32 in a manner as described hereinafter.

Figure 4:
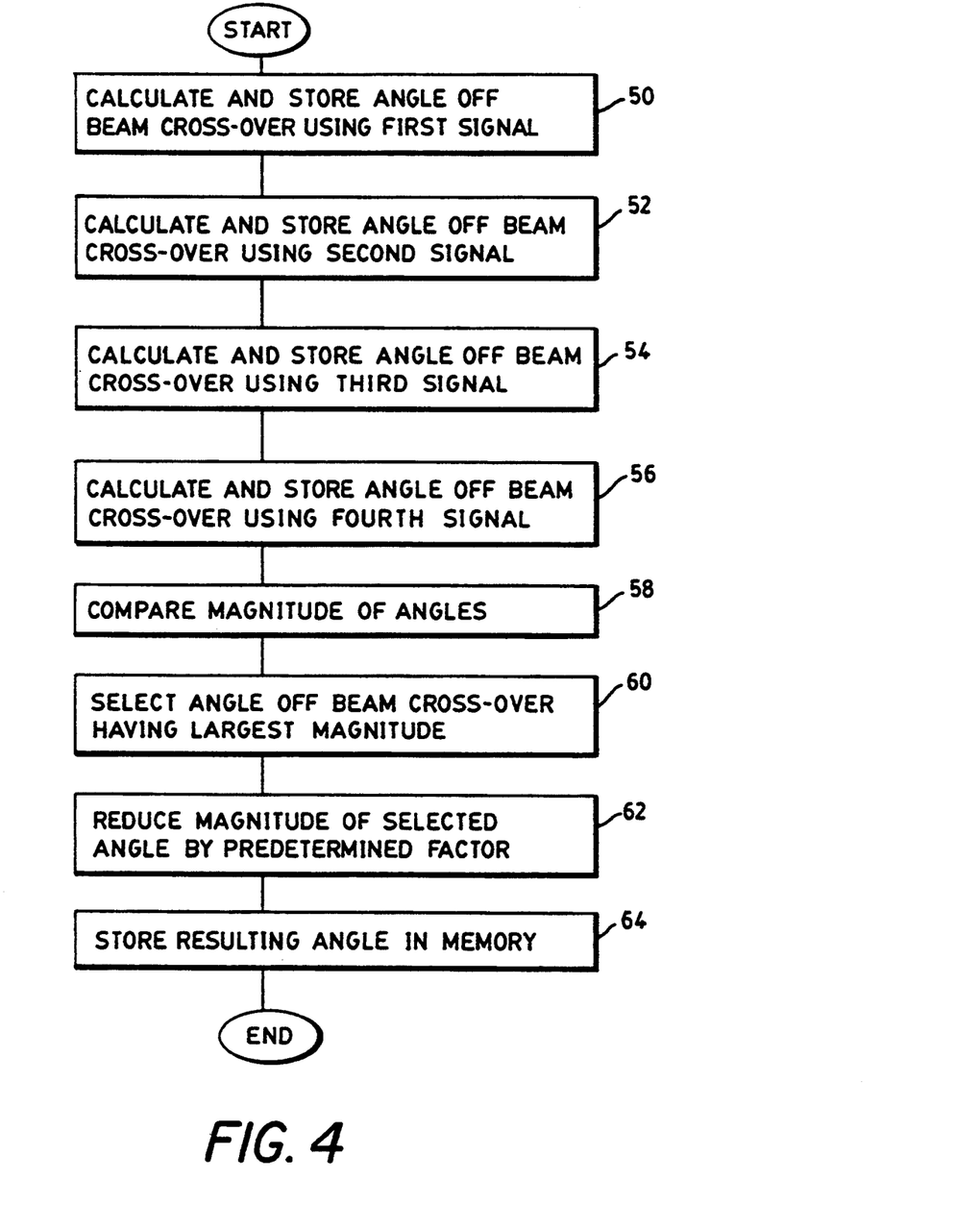
FIG. 4 is a flow chart of a technique of operating a radar system according to the invention.

Referring now to FIG. 4, a technique for reducing the effect of multipath will be described. As the antenna 12 (FIG. 1) rotates in azimuth, the transmitter 32 transmits a signal having a first frequency, here for example 10 GHz, and the radar return signals are processed to calculate a first angle off beam cross-over as shown in processing block 50. The transmitter 32 next transmits a signal having a second frequency, here for example 10.75 GHz, and the radar return signals are processed to calculate a second angle off beam cross-over as shown in processing block 52. The transmitter 32 next transmits a signal having a third frequency, here for example 11.5 GHz, and the radar return signals are processed to calculate a third angle off beam cross-over as shown in processing block 54. The transmitter 32 next transmits a signal having a fourth frequency, here for example 13 GHz, and the radar return signals are processed to calculate a fourth angle off beam cross-over as shown in processing block 56. Next, the four angles off beam cross-over are compared as shown in processing block 58 and the angle having the largest magnitude is selected as shown in processing block 60. The magnitude of the selected angle is reduced by a predetermined reduction factor, here a factor of 0.92, as shown in processing block 62. The resulting elevation angle is then stored in computer memory 46 (FIG. 3) as shown in processing block 64 and provided to the utilization device as required. The above described process is repeated again and again as the antenna 12 rotates in azimuth with a resulting elevational angle provided for each azimuthal position of the antenna 12.

Figure 4A:
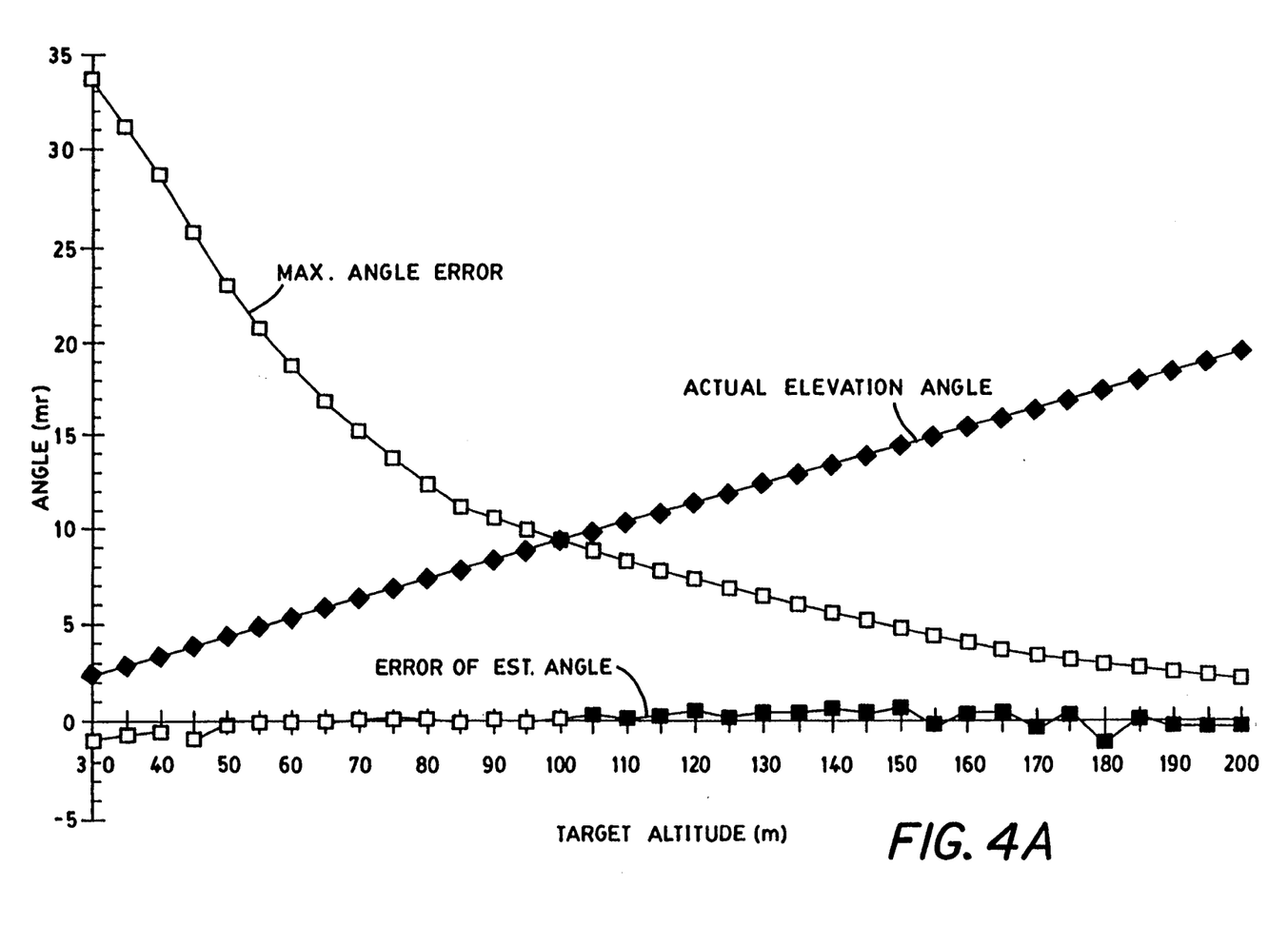
FIG. 4A is a plot of angle error vs. target altitude using the technique of FIG. 4.

Referring now to FIG. 4A, a plot of the maximum angle error in milliradians vs. target altitude in meters is shown as well as a plot of the error realized using the above described technique for reducing multipath errors. A plot of the actual target elevation angle is also shown. The range to the target is 10 kilometers and the standard deviation of the height distribution, H, is here equal to 0.3 meters. It should be apparent that the above described technique reduced the elevation angle error significantly. It should also be apparent that the frequency selection and the angle reduction factor may be varied from the above described values based on empirical tests. For example, it may be desirable to adjust the angle reduction factor for different types of terrain. For the above described frequencies, a frequency range of approximately 3 GHz was found to be desirable, although at other frequency bands an alternative range may be more desirable. The frequency regimes wherein the angle off beam cross-over reaches maximum values will also produce the maximum signal amplitudes, thus the frequency at which the maximum angle occurs can be used on the next radar scan (if within a second or two) to eliminate multipath losses. The above discussion was based on a flat earth and specular reflection. The effect of earth curvature will move the angle nulls to different frequencies, but the result obtained by the above described technique will remain.

Figure 5:
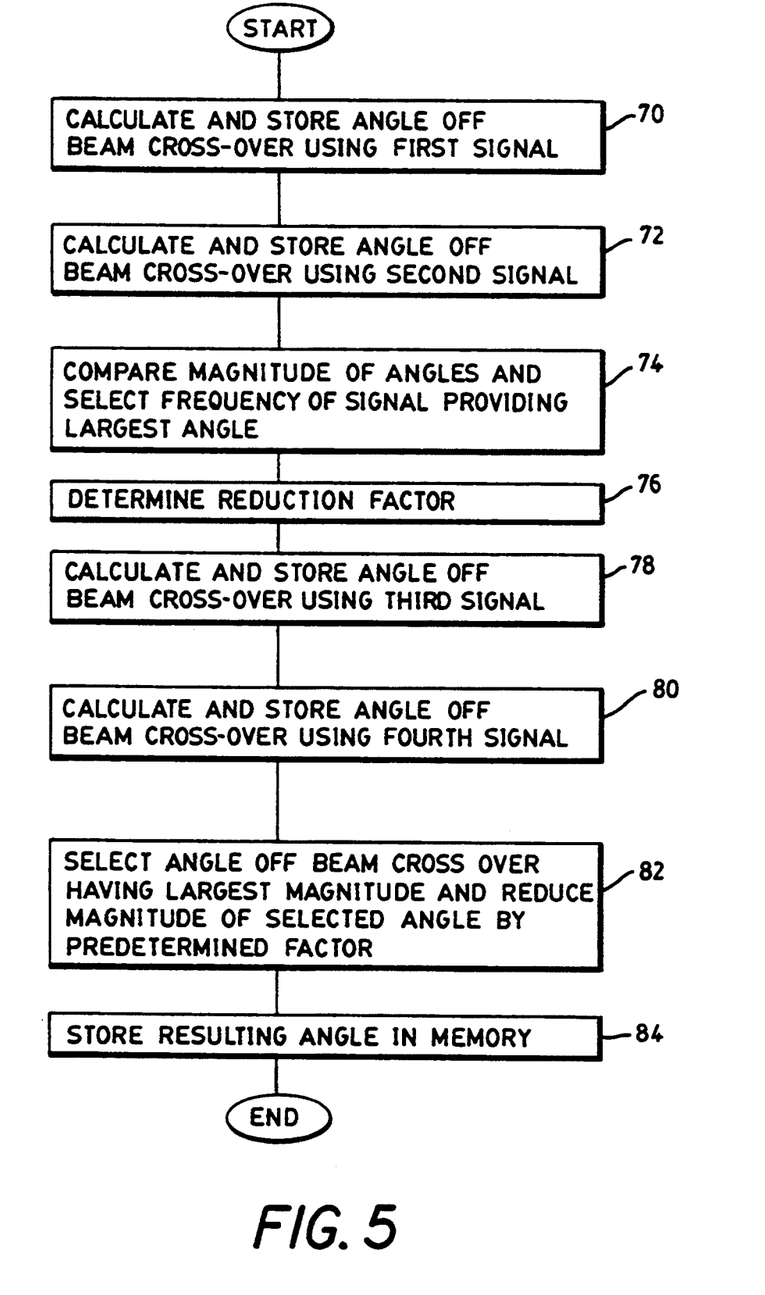
FIG. 5 is a flow chart of an alternate technique of operating a radar system according to the invention.

It should be appreciated that, depending upon the rotational speed of the antenna 12, there may not be sufficient time to transmit four signals during a single dwell period (i.e. azimuthal position) of the radar system 10. To accommodate a faster rotational speed of the antenna 12, an alternative technique for implementing the above described procedure is described. Referring now to FIG. 5, during the first scan of the antenna 12, the transmitter 12 transmits a first signal having a first frequency, here 10 GHz, and the radar return signals are processed to calculate a first angle off beam cross-over as shown in processing block 70 and then transmits a second signal having a second frequency, here 13 GHz, and the radar return signals are processed to calculate a second angle off beam cross-over as shown in processing block 72 during a time on target (i.e. dwell period). The latter is accomplished for each dwell period as the antenna 12 rotates in azimuth with the results thereof stored in memory 46 (FIG. 3). If a target return signal (i.e. echo signal) is detected, the magnitude of the angles are compared and the frequency of the signal providing the largest angle is stored in memory as shown in processing block 74. From a look up table, a reduction factor corresponding for that angle is ascertained as shown in processing block 76 (it has been observed that for elevation angles below 0.25 degrees, the reduction factor increases from 0.92 to 0.97). During the second scan of the antenna 12, the transmitter 12 transmits a third signal having a third frequency, here either 9.5 or 12.5 GHz, and the radar return signals are processed to calculate a third angle off beam cross-over as shown in processing block 78 and then transmits a fourth signal having a fourth frequency, here either 10.5 or 13.5 GHz, and the radar return signals are processed to calculate a fourth angle off beam cross-over as shown in processing block 80 during the time on target (i.e. dwell period). During the second scan of the target, the transmitter first transmits on a predetermined frequency, here approximately 0.5 GHz, below and then transmits on a predetermined frequency, here approximately 0.5 GHz, above the frequency of the signal providing the largest angle off beam cross-over during the first scan (i.e, dwell period). As shown in processing block 82, from the calculated angles during the second scan of the target and the selected angle during the first scan of the target, the angle off beam cross-over having the largest magnitude is selected and the selected magnitude is reduced by the reduction factor determined in processing block 76 to obtain the estimate of the actual angle of the target. The resulting elevation angle is then stored in computer memory 46 (FIG. 3) as shown in processing block 84 and provided to the utilization device as required. The latter technique accommodates a faster rotational speed of the antenna 12 wherein the required time on target is reduced in half but requires two rotations of the antenna 12. It should be appreciated that a lookup table to obtain an appropriate reduction factor can be provided for varying frequencies at each angle off beam cross-over based on empirical data.

Figure 5A:
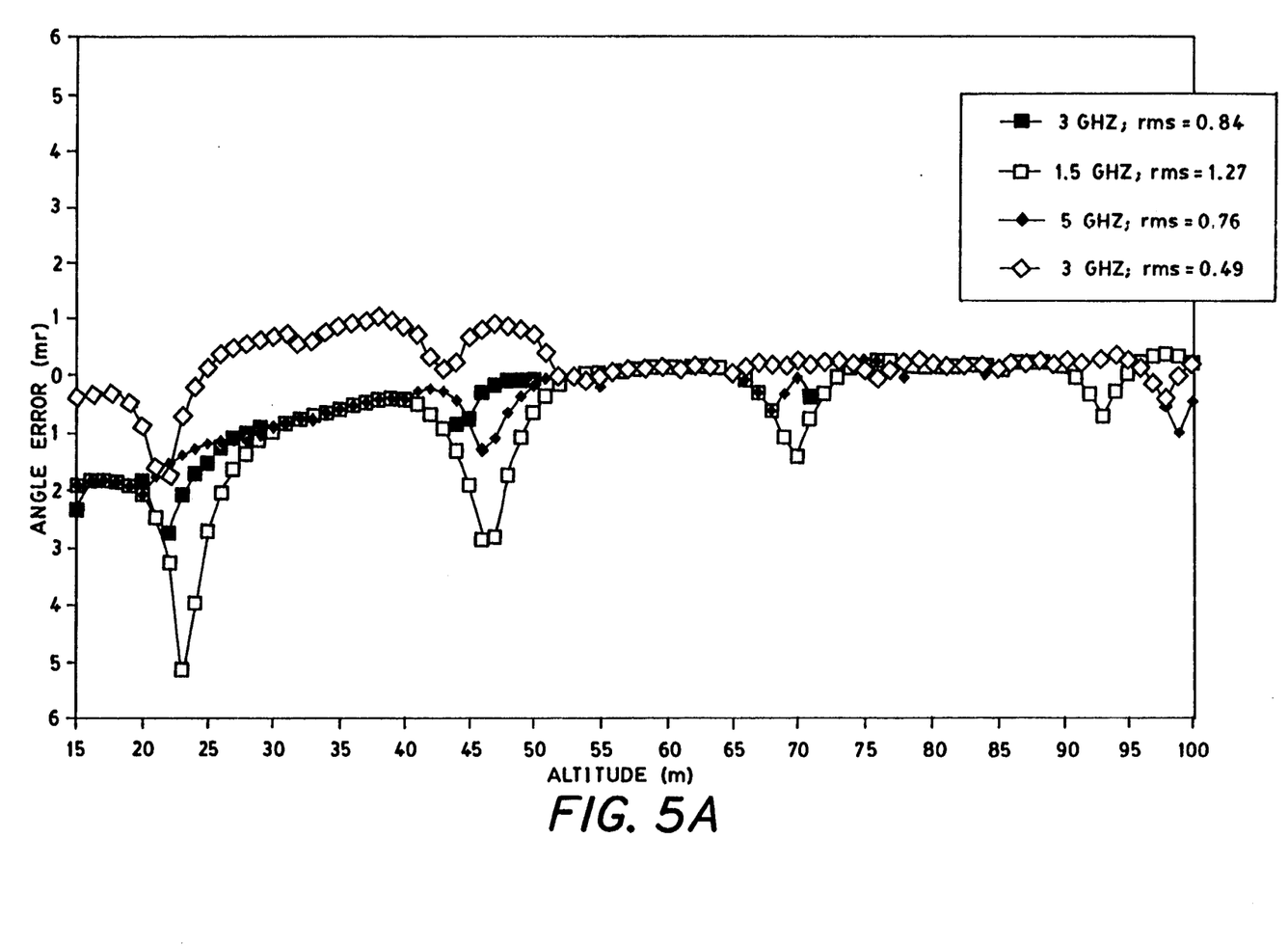
FIG. 5A is a plot of angle error vs. target altitude using the technique of FIG. 5.

Referring now to FIG. 5A, a plot of the angle error in milliradians vs. target altitude in meters (i.e. curve with open diamonds labeled "3 GHz; rms=0.49") is shown using the above described technique for reducing multipath errors. The range to the target is 10 kilometers and the standard deviation of the height distribution, H, is here equal to 0.3 meters. The rms angle error for the indicated altitude regime is 0.49 milliradians. It should be apparent that the above described technique reduced the elevation angle error significantly. FIG. 5A also shows the curve with closed boxes labeled "3 GHz; rms 0.84" which shows the angle error resulting from using four frequencies over a 3 GHz range within a single dwell period as described previously. The curve with open boxes labeled "1.5 GHz; rms 1.27" shows the angle error using four frequencies over a 1.5 GHz range within a single dwell period and the curve with closed diamonds labeled "5 GHz; rms 0.76" shows the angle error using four frequencies over a 5 GHz range within a single dwell period. These latter three curves are provided to illustrate the sensitivity of the technique's effectiveness to the range of frequency selection.

It should also be apparent that the frequency selection and the angle reduction factor may be varied from the above described values based on empirical tests.

Having described this invention, it will now be apparent to one of skill in the art that various modifications could be made thereto without affecting this invention. It is felt, therefore, that this invention should not be restricted to its disclosed embodiment, but rather should be limited only by the spirit and scope of the appended claims.

What is claimed is:

1. A method of operating a radar system comprising the steps of:
    (a) transmitting, during a first dwell period, a plurality of signals, each signal having a different frequency and receiving, if existing, a corresponding echo signal from each one of the plurality of signals;
    (b) ascertaining an angle off beam cross-over of a target from each existing echo signal; and
    (c) selecting the angle off beam cross-over having the largest magnitude and ascertaining a reduction factor appropriate for the selected angle.

2. The method as recited in claim 1 further comprising the step of reducing the magnitude of the selected angle by the reduction factor.

3. The method as recited in claim 2 wherein the plurality of signals number four.

4. The method as recited in claim 3 wherein the reduction factor is ascertained by a lookup table.

5. The method as recited in claim 1 further comprising the steps of:
    (a) transmitting, during a second dwell period, a second plurality of signals, each signal having a different frequency and receiving, if existing, a corresponding echo signal from each one of the second plurality of signals;
    (b) ascertaining an angle off beam cross-over of a target from each echo signal;
    (c) selecting the angle off beam cross-over having the largest magnitude; and
    (d) reducing the magnitude of the selected angle by the reduction factor.

6. The method as recited in claim 5 wherein the step of transmitting a second plurality of signals comprises the steps of:
    (a) determining the frequency of the transmitted signal producing the largest angle off beam cross-over during the first dwell period;
    (b) transmitting a signal having a frequency below the frequency of the transmitted signal producing the largest angle off beam cross-over during the first dwell period; and
    (c) transmitting a signal having a frequency above the frequency of the transmitted signal producing the largest angle off beam cross-over during the first dwell period.

7. The method as recited in claim 6 wherein the frequency below the frequency of the transmitted signal producing the largest angle off beam cross-over and the frequency above the frequency of the transmitted signal producing the largest angle off beam cross-over are separated from the frequency of the transmitted signal by a predetermined frequency.

8. The method as recited in claim 7 wherein the predetermined frequency is 500 MHz.

9. A method of operating a radar system comprising the steps of:

(a) transmitting, during a first dwell period, a plurality of signals, each signal having a different frequency and receiving, if existing, a corresponding echo signal from each one of the plurality of signals;

(b) ascertaining an angle off beam cross-over of a target from each existing echo signal;

(c) selecting the angle off beam cross-over having the largest magnitude; and (d) reducing the magnitude of the selected angle by a predetermined factor.

10. The method as recited in claim 9 wherein the predetermined factor is a value between 0.92 and 0.97.

11. A radar system comprising:

(a) means for transmitting, during a first dwell period, a plurality of signals, each signal having a different frequency and receiving, when obtainable, a corresponding echo signal from each one of the plurality of signals;

(b) means for ascertaining an angle off beam cross-over of a target from each obtainable echo signal; and (c) means for selecting the angle off beam cross-over having the largest magnitude and ascertaining a reduction factor appropriate for the selected angle.

12. The radar system as recited in claim 11 further comprising means for reducing the magnitude of the angle by the reduction factor.

13. The radar system as recited in claim 12 wherein the reduction factor ascertaining means comprises a lookup table to ascertain the reduction factor.

14. The radar system as recited in claim 11 further comprising:

(a) means for transmitting, during a second dwell period, a second plurality of signals, each signal having a different frequency and receiving, when obtainable, a corresponding echo signal from each one of the second plurality of signals;

(b) means for ascertaining an angle off beam cross-over of a target from each echo signal;

(c) means for selecting the angle off beam cross-over having the largest magnitude; and (d) means for reducing the magnitude of the angle by a predetermined factor.

15. The radar system as recited in claim 14 further comprising means for determining the frequency of the transmitted signal producing the largest angle off beam cross-over during the first dwell period and wherein the means for transmitting a second plurality of signals comprises means for transmitting a signal having a frequency below the frequency of the transmitted signal producing the largest angle off beam cross-over during the first dwell period and means for transmitting a signal having a frequency above the frequency of the transmitted signal producing the largest angle off beam cross-over during the first dwell period.

16. The radar system as recited in claim 15 wherein the frequency below the frequency of the transmitted signal producing the largest angle off beam cross-over and the frequency above the frequency of the transmitted signal producing the largest angle off beam cross-over are separated from the frequency of the transmitted signal by a predetermined frequency.

17. The radar system as recited in claim 16 wherein the reduction factor is ascertained by a lookup table.

18. The radar system as recited in claim 16 wherein the predetermined frequency is 500 MHz.

* * * * *